United States Patent
Li (10) Patent No.: US 11,445,412 B2
(45) Date of Patent: Sep. 13, 2022

(54) ACCESS CONTROL METHOD, APPARATUS AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 79 days.

(21) Appl. No.: 17/269,591

(22) PCT Filed: Aug. 30, 2018

(86) PCT No.: PCT/CN2018/103359
§ 371 (c)(1),
(2) Date: Feb. 19, 2021

(87) PCT Pub. No.: WO2020/042118
PCT Pub. Date: Mar. 5, 2020

(65) Prior Publication Data
US 2021/0314822 A1    Oct. 7, 2021

(51) Int. Cl.
*H04W 36/00* (2009.01)
*H04W 36/08* (2009.01)
*H04W 48/08* (2009.01)

(52) U.S. Cl.
CPC ........ *H04W 36/0011* (2013.01); *H04W 36/08* (2013.01); *H04W 48/08* (2013.01)

(58) Field of Classification Search
CPC . H04W 36/0011; H04W 36/08; H04W 48/08; H04W 36/24; H04W 48/16
See application file for complete search history.

(56) References Cited

U.S. PATENT DOCUMENTS

2016/0157290 A1* 6/2016 Lee ................. H04W 48/18
                                                    370/329
2016/0205040 A1* 7/2016 Wirtanen ........... H04W 4/12
                                                    370/230

(Continued)

FOREIGN PATENT DOCUMENTS

CN    101945450 A    1/2011
CN    102469519 A    5/2012

(Continued)

OTHER PUBLICATIONS

3GPP TS 24.301 V17.2.0 (Mar. 2021), Technical Specification Group Core Network and Terminals; Non-Access-Stratum (NAS) protocol for Evolved Packet System (EPS); 588 pgs.

(Continued)

*Primary Examiner* — Hashim S Bhatti
(74) *Attorney, Agent, or Firm* — Cooper Legal Group, LLC (57) ABSTRACT

The present disclosure relates to an access control method and apparatus and a storage medium, wherein the access control method comprises: when a terminal operates a first T302 timer and when the terminal changes a cell, executing any one of the operations as follows: stopping the first T302 timer, or stopping or holding the first T302 timer according to a received command sent by a network side device. According to the present disclosure, the operation of a T302 timer operated on the terminal can be effectively controlled according to the state of the terminal.

18 Claims, 6 Drawing Sheets

(56) References Cited

U.S. PATENT DOCUMENTS

| | | | |
|---|---|---|---|
| 2016/0205630 A1* | 7/2016 | Chen | H04W 48/02 |
| | | | 455/574 |
| 2017/0041854 A1* | 2/2017 | Kim | H04W 28/02 |
| 2020/0120477 A1* | 4/2020 | Mildh | H04W 28/0289 |
| 2020/0404729 A1* | 12/2020 | Mildh | H04W 68/005 |
| 2021/0127445 A1* | 4/2021 | da Silva | H04W 76/30 |

FOREIGN PATENT DOCUMENTS

| | | |
|---|---|---|
| CN | 105493614 A | 4/2016 |
| CN | 107079368 A | 8/2017 |

OTHER PUBLICATIONS

3GPP TS 36.331 V16.4.0 (Mar. 2021), Technical Specification Group Radio Access Network; Evolved Universal Terrestrial Radio Access (E-UTRA); Radio Resource Control (RRC); Protocol specification (Release 16), 1084 pgs.

3GPP TSG RAN. "Radio Resource Control (RRC) Protocol Specification(Release 15)", 3GPP TS 25.331 V15.3.0, Jun. 23, 2018 (Jun. 23, 2018), 2318 pgs.

Spreadtrum Communications. "Stop Barring Timers for the Unified Access Control (E117)", 3GPP TSG-RAN WG2 Meeting #103 R2-1811413, Aug. 9, 2018 (Aug. 9, 2018), 7 pgs.

Ericsson. "Report of Email Discussion [AH1807#10] [NR] Access Control (Ericsson)", 3GPP TSG-RAN WG2 #103 Tdoc R2-1811314,Aug. 10, 2018 (Aug. 10, 2018), 14 pgs.

International Search Report in the international application No. PCT/CN2018/103359, dated Apr. 30, 2019, 3 pgs.

English translation of the Written Opinion of the International Search Authority in the international application No. PCT/CN2018/103359, dated Apr. 30, 2019, 3 pgs.

First Office Action of the Chinese application No. 201880001573.2, dated Sep. 3, 2020, 12 pgs.

3GPP TSG-RAN2# 103 R2-1811761, Gothenburg, Sweden, Aug. 20-24, 2018, Agenda Item: 10.4.1.3.6; Source: Xiaomi Communications; Title: The discussion on wait timer T302, 2 pgs.

* cited by examiner

ACCESS CONTROL METHOD, APPARATUS AND STORAGE MEDIUM

TECHNICAL FIELD

The present disclosure relates to the technical field of communication technologies, and particularly to an access control method, apparatus and storage medium.

BACKGROUND

In the related art, an Access Control (AC) barring mechanism of Long Term Evolution (LTE) is as follows: an AC barring parameter is obtained according to an access class, i.e. AccessClass, of User Equipment (UE) and a call type, i.e. Calltype, initiated by the UE, to perform AC barring check. The access class includes that AC0-9 is an ordinary user and AC11-15 is a high-priority user. The call type is used to indicate what kind of service request the current call is. The call type is provided by a Non Access Stratum (NAS) when initiating a call request to an Access Stratum (AS). The basic process of the AC barring check is that the AS obtains an AC barring parameter according to the call type provided by the higher layer to perform AC barring check. For ordinary users (AC0-9), the AC barring parameter usually takes the form of a random number, but for high-priority users (AC11-15) it takes a form of a bitmap file, i.e. bitmap, to decide whether to perform the barring. For the form of the random number, a random number is generated and compared with an access barring parameter, i.e. ac-BarringFactor. If the random number is less than the ac-BarringFactor, the barring is not performed. Otherwise, if the barring is performed, the T30x timer needs to be started, and the timing duration of the T30x timer is calculated based on the access barring time, i.e. ac-BarringTime. For New Radio (NR), a unified AC barring mechanism is introduced. The basic principle thereof is similar to that of the LTE, except that an access attribute of UE and a call type initiated by the UE are replaced by one or more access identities and an access category, respectively, which is then provided by the NAS to the AS to perform a decision of AC barring. The difference is that the AC barring mechanism of NR is used for both idle UE (including inactive UE) and connected UE. In LTE and NR, the AC barring and the T302 timer are closely associated, and the T302 is a wait time, i.e. wait-Time, for the UE carried in a Radio Resource Control (RRC) connection rejection, i.e. ConnectionReject, message. When the T302 timer is started, the UE can make only certain types of calls, and other types of calls are barred. In the related art, how to control the behavior of the T302 timer when a cell change, such as a cell handover or a Radio Access Network (RAN) Notification Area (RNA) updated (update), occurs for the UE during the running of the T302 timer, there is no solution at present.

SUMMARY

To overcome the above problems in the related art, the disclosure provides an access control method, apparatus, and storage medium.

According to a first aspect of the disclosure, there is provided an access control method, applied to a terminal, the method including: when the terminal runs a first T302 timer and the terminal changes a cell, performing any one of the following operations: stopping the first T302 timer; or stopping or maintaining the first T302 timer according to a command received from a network side device.

Optionally, that the terminal changes the cell includes that the terminal hands over a cell that the terminal accesses, and the operation of stopping or maintaining the first T302 timer according to the command received from the network side device includes an operation of stopping the first T302 timer when a cell handover command received from the network side device does not include a timing duration of the T302 timer.

Optionally, that the terminal changes the cell includes that the terminal hands over a cell that the terminal accesses, and the operation that stopping or maintaining the first T302 timer according to the command received from the network side device includes an operation of stopping the first T302 timer and starting a second T302 timer, when a cell handover command received from the network side device includes a first timing duration, herein the first timing duration is a timing duration of the second T302 timer.

Optionally, that the terminal changes the cell includes that the terminal hands over a cell that the terminal accesses, and the operation of stopping or maintaining the first T302 timer according to the command received from the network side device includes an operation of maintaining the first T302 timer when a cell handover command received from the network side device does not include a timing duration of the T302 timer.

Optionally, the operation of stopping or maintaining the first T302 timer according to the command received from the network side device includes an operation of stopping the first T302 timer and starting the second T302 timer, when the first timing duration in the cell handover command is longer than the timing duration.

Optionally, that the terminal changes the cell includes that the terminal hands over a cell that the terminal accesses, and the operation of stopping or maintaining the first T302 timer according to the command received from the network side device includes an operation of stopping the first T302 timer when a cell handover command received from the network side device does not include a timing duration of a T302 timer.

Optionally, that the terminal changes the cell includes that the terminal performs a Radio Access Network Notification Area (RNA) update, and the operation of stopping or maintaining the first T302 timer according to the command received from the network side device includes an operation of stopping the first T302 timer and starting a third T302 timer, when a recovery command received from the network side device includes a second timing duration, herein the second time length is a timing duration of the third T302 timer.

Optionally, that the terminal changes the cell includes that the terminal performs an RNA update, and the operation of stopping or maintaining the first T302 timer according to the command received from the network side device includes an operation of maintaining the first T302 timer when a recovery command received from the network side device does not include a timing duration of a T302 timer.

Optionally, the operation of stopping or maintaining the first T302 timer according to the command received from the network side device includes an operation of stopping the first T302 timer and starting the third T302 timer, when the second timing in the recovery command is longer than the timing duration of the first T302 timer.

Optionally, the method further includes an operation of notifying a timing duration of the first T302 timer to a target base station, herein the target base station is a base station of a target cell of the terminal after the terminal changes the cell.

According to a second aspect of the disclosure, there is provided an access control apparatus, applied to a terminal, the apparatus includes an executing module, configured to perform any one of the following operations when the terminal runs a first T302 timer and the terminal changes a cell: stopping a first T302 timer; or stopping or maintaining the first T302 timer according to a command received from a network side device.

Optionally, that the terminal changes the cell includes that the terminal hands over a cell that the terminal accesses, and the executing module includes a first stopping submodule, configured to stop the first T302 timer when a cell handover command received from the network side device does not include a timing duration of the T302 timer.

Optionally, that the terminal changes the cell includes that the terminal hands over a cell that the terminal accesses, and the executing module includes a first starting submodule, configured to stop the first T302 timer and start a second T302 timer, when a cell handover command received from the network side device includes a first timing duration, herein the first timing duration is a timing duration of the second T302 timer.

Optionally, that the terminal changes the cell includes that the terminal hands over a cell that the terminal accesses, and the executing module includes a first maintaining submodule, configured to maintain the first T302 timer when a cell handover command received from the network side device does not include a timing duration of a T302 timer.

Optionally, the executing module includes a second starting submodule, configured to stop the first T302 timer and start the second T302 timer, when the first timing duration in the cell handover command is longer than the timing duration of the first T302 timer.

Optionally, that the terminal changes the cell includes that the terminal performs an RNA update, and the executing module includes a second stopping submodule, configured to stop the first T302 timer when a recovery command received from the network side device does not include a timing duration of a T302 timer.

Optionally, that the terminal changes the cell includes that the terminal performs an RNA update, and the executing module includes a third starting submodule, configured to stop the first T302 timer and start the third T302 timer, when a recovery command received from the network side device includes a second timing duration, herein the second timing duration is a timing duration of the third T302 timer.

Optionally, that the terminal changes the cell includes that the terminal performs an RNA update, and the executing module includes a second maintaining submodule, configured to maintain the first T302 timer when a recovery command received from the network side device does not include a timing duration of a T302 timer.

Optionally, the executing module includes a fourth starting submodule, configured to stop the first T302 timer and start the third T302 timer, when the second timing duration in the recovery command is longer than the timing duration of the first T302 timer.

Optionally, the apparatus further includes: a notification module, configured to notify a timing duration of the first T302 timer to a target base station, wherein the target base station is a base station of a target cell of the terminal after the terminal changes the cell.

According to a third aspect of the disclosure, an access control apparatus is provided, the apparatus includes a processor and a memory for storing instructions executed by the processor; herein the processor is configured to perform any one of the following operations when the terminal runs the first T302 timer and the terminal changes the cell: stopping the first T302 timer; or stopping or maintaining the first T302 timer according to a command received from the network side device.

According to a fourth aspect of the disclosure, there is provided a non-temporary computer-readable storage medium having instructions stored thereon, the instructions, when being performed by a processor, cause the processor to perform the method according to the first aspect of the disclosure.

The technical solution provided by the embodiments of the disclosure may have the following beneficial effects:

According to the access control method of the embodiment of the disclosure, when a terminal changes a cell, a running T302 timer can be stopped, or the T302 timer can also be determined to stop or maintain according to a command sent by a network side device. Therefore, the operation of the running T302 timer on the terminal can be controlled effectively according to a state of the terminal. When the running T302 timer is stopped, it can ensure that the terminal continues to attempt to establish an RRC connection, which improves the RRC connection efficiency of the terminal. When the running T302 timer is maintained, the burden on the network-side device to process RRC connection requests can be reduced.

It is to be understood that the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure, and together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The T302 timer mentioned in the disclosure is used to control a time interval between a moment when a network-side device (e.g., a base station) rejects a Radio Resource Control (RRC) connection establishment of a terminal and a moment when the terminal initiates an RRC connection establishment procedure next time. After receiving the RRC connection rejection message, the terminal obtains a parameter, i.e. a waitTime, in the message, and the value of the timing duration of the T302 timer is determined by the waitTime.

In an exemplary implementation scenario for the access control method disclosed in the present disclosure, a terminal in an idle state receives an RRC connection rejection message from a network side. According to a wait time carried in the message, the T302 timer is started by using the wait time as a timing duration of the T302 timer. The running T302 timer in the terminal can be controlled to be stopped or to be continued to run if the cell of the terminal changes in a case that the terminal enters the connected state from the idle state due to an emergency call initiated by the terminal or paging initiated by the core network (CN), or in a case that the terminal that was originally in the inactive state starts the T302 timer, then the terminal enters the connected state from the inactive state due to an emergency call initiated by the terminal and paging initiated by the network.

Figure 1:
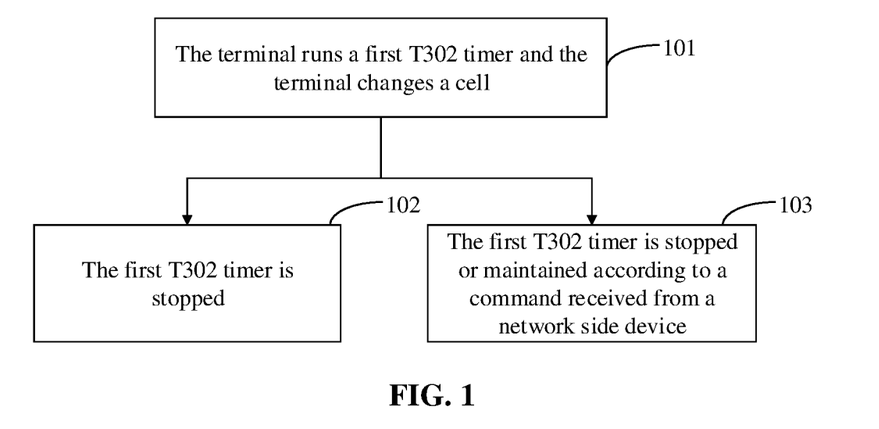
FIG. 1 is a flowchart of an access control method according to an exemplary embodiment.

FIG. 1 is a flowchart of an access control method according to an exemplary embodiment, the method may be applied to a terminal. As shown in FIG. 1, the method includes the following operations.

In operation 101, when the terminal runs a first T302 timer and the terminal changes a cell, operation 102 or operation 103 is performed.

In operation 102, the first T302 timer is stopped, and in operation 103, the first T302 timer is stopped or maintained according to a command received from a network side device.

In operation 102, when it is determined that the terminal is running the first T302 timer, if the cell change has occurred for the terminal, the terminal stops the first T302 timer, so that the terminal may continue to attempt to establish an Radio Resource Control (RRC) connection with the network side.

In one implementation, that the terminal changes the cell may include the following situations: the terminal changes the cell to which the terminal is connected in the connected state, or the terminal performs RNA update in the inactive state. Since one RNA may be divided into a plurality of cells, if the terminal performs the RNA update, the cell of the terminal must be changed.

In one implementation, the network side device may be, for example, a base station.

The T302 timer is used to control the time interval between a moment when the network side device rejects the RRC connection establishment of the terminal and the moment when the terminal initiates the RRC connection establishment procedure next time, and a first timing duration of the T302 timer may be a wait time, i.e. waitTime, carried in the RRC connection rejection message issued by the network side device.

With the access control method of the embodiment of the disclosure, when a terminal performs a cell change, a running T302 timer can be stopped, or the running T302 timer can also be determined to be stopped or maintained according to a command sent by a network side device. Therefore, the operation of the running T302 timer on the terminal can be controlled effectively according to a state of the terminal. When the running T302 timer is stopped, it can ensure that the terminal continues to attempt to establish an RRC connection, which improves the efficiency of the RRC connection of the terminal. When the running T302 timer is maintained, the burden on the network-side device to process RRC connection requests can be reduced.

In one possible implementation, the terminal changes the cell includes: the terminal hands over a cell that the terminal accesses. Based on this, the operation that the first T302 timer is stopped or maintained according to the command received from the network side device includes an operation that the first T302 timer is stopped when a cell handover command received from the network side device does not include a timing duration of a T302 timer. The first T302 timer is stopped in time so that the terminal continues to attempt to establish the RRC connection with the network side.

Figure 2:
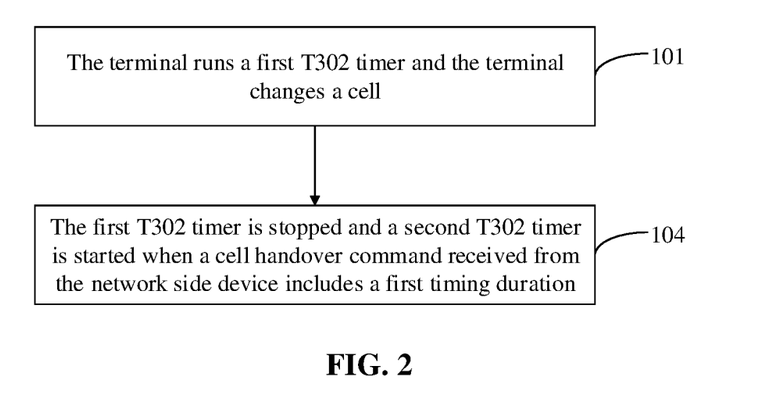
FIG. 2 is a flowchart of an access control method according to an exemplary embodiment.

In one implementation, that the terminal changes the cell includes that the terminal hands over a cell that the terminal accesses. FIG. 2 is a flowchart of an access control method according to an exemplary embodiment. In the method as shown in FIG. 2, the operation that the first T302 timer is stopped or maintained according to the command received from the network side device includes the following operations: in operation 104, the first T302 timer is stopped and a second T302 timer is started when a cell handover command received from the network side device includes a first timing duration, for example, when the handover command includes a new value of a timing duration of the T302 timer, herein the first timing duration is a timing duration of the second T302 timer. When the first T302 timer is stopped and the second T302 timer is started, the first T302 timer is expired after the terminal is switched to a new cell, and the terminal starts the T302 timer according to the timing duration of the second T302 timer in the cell handover command. The first timing duration may be the same as or different from the timing duration of the first T302, and the embodiment is not specifically limited thereto.

Figure 3:
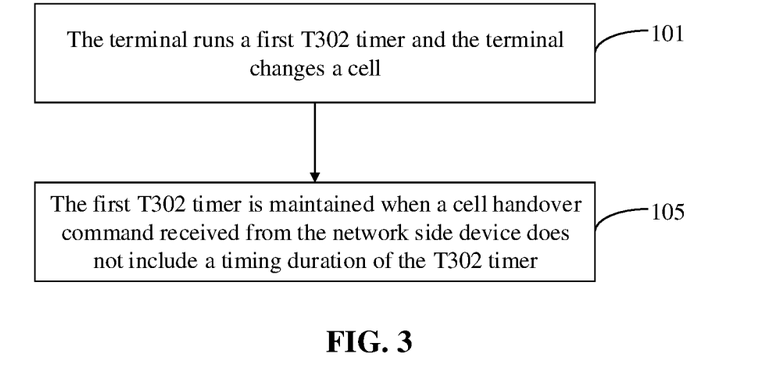
FIG. 3 is a flowchart of an access control method according to an exemplary embodiment.
Figure 4:
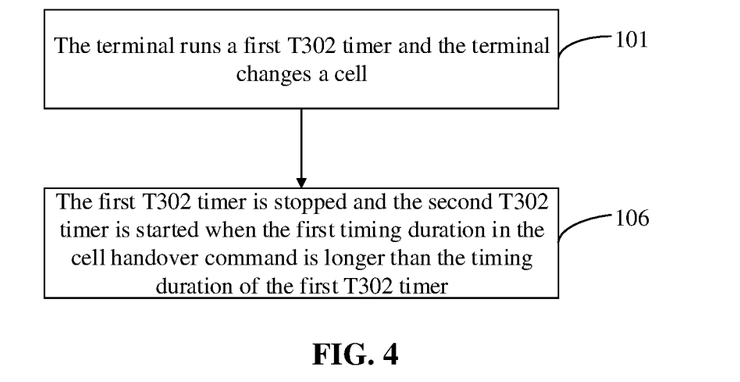
FIG. 4 is a flowchart of an access control method according to an exemplary embodiment.

In one implementation, that the terminal changes the cell includes that the terminal hands over a cell that the terminal accesses. FIG. 3 is a flowchart of an access control method according to an exemplary embodiment. In the method as shown in FIG. 3, the operation that the first T302 timer is stopped or maintained according to the command received from the network side device may include the following operations: in operation 105, the first T302 timer is maintained, i.e. the first T302 timer continues to run, when a cell handover command received from the network side device does not include a timing duration of the T302 timer, for example, when the received cell handover command does not include a new value of the timing duration of the T302. For example, it is assumed that the timing duration of the first T302 timer is 3 s and that the timer has been running for 2 s at present, the first T302 timer is maintained, i.e. the first T302 timer continues to run for 1 s FIG. 4 is a flowchart of an access control method according to an exemplary embodiment, in the method as shown in FIG. 4, the operation that the first T302 timer is stopped or maintained according to the command received from the network-side device includes the following operations: in operation 106, the first T302 timer is stopped and the second T302 timer is started when the first timing duration in the cell handover command is longer than the timing duration of the first T302 timer. For example, when the timing duration of the first T302 timer is 2 s and the timing duration of the second T302 timer is 3 s, the first T302 timer whose timing duration is 2 s is stopped, and the second T302 timer whose timing duration is 3 s is started. On the other hand, when the first timing duration included in the cell handover command received from the network-side device is not longer than the timing duration of the first T302 timer, for example, when the timing duration of the first T302 timer is 2 s and the first timing duration is 1.5 s, the first T302 timer may be maintained.

Optionally, that the terminal changes a cell includes that the terminal performs an RNA update, the operation that the first T302 timer is stopped or maintained according to the command received from the network side device includes an operation that the first T302 timer is stopped when a recovery command received from the network side device does not include a timing duration of the T302 timer.

Figure 5:
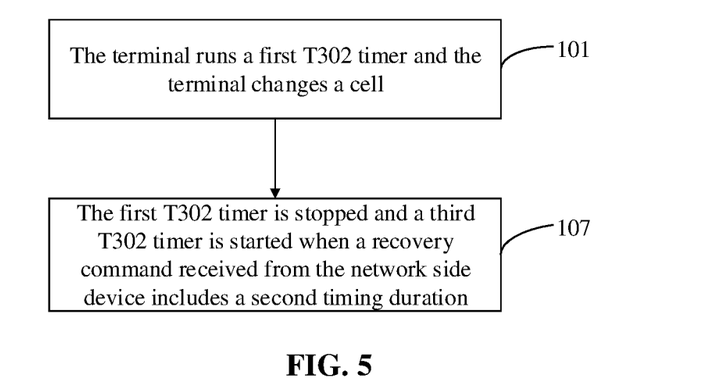
FIG. 5 is a flowchart of an access control method according to an exemplary embodiment.

In one implementation, that the terminal changes the cell includes that the terminal performs an RNA update, i.e. the terminal changes the cell due to the RNA update. FIG. 5 is a flowchart of an access control method according to an exemplary embodiment. In the method as shown in FIG. 5, the operation that the first T302 timer is stopped or maintained according to the command received from the network side device includes the following operations: in operation 107, the first T302 timer is stopped and a third T302 timer is started when a recovery command (also called Resume command) received from the network side device includes a second timing duration, for example, when the recovery command includes a new value of a timing duration of a T302 timer. The second timing duration is a timing duration of the third T302 timer. After the first T302 timer is stopped and the third T302 timer is started and after the terminal updates the RNA, the first T302 timer expires, and the terminal starts the third T302 timer according to the timing duration of the third T302 timer in the cell handover command. The second timing duration may be the same as or different from the timing duration of the first T302 timer, which is not specifically limited in this embodiment.

Figure 6:
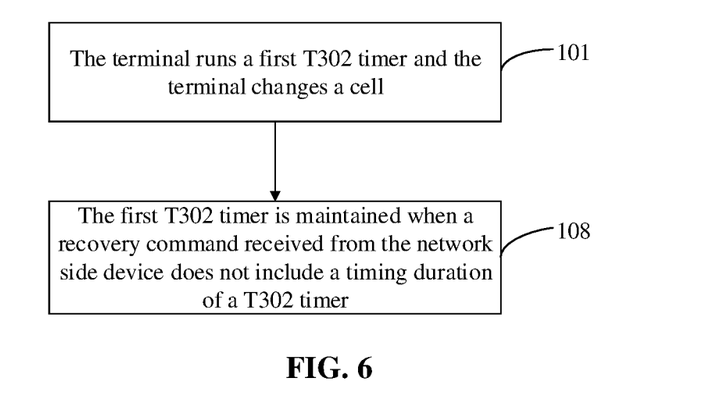
FIG. 6 is a flowchart of an access control method according to an exemplary embodiment.

In one implementation, that the terminal changes the cell includes that the terminal performs an RNA update, that is, the terminal changes the cell due to the RNA update. FIG. 6 is a flowchart of an access control method according to an exemplary embodiment. In the method, the operation that the first T302 timer is stopped or maintained according to the command received from a network side device includes the following operations: in operation 108, the first T302 timer is maintained when a recovery command received from the network side device does not include a timing duration of a T302 timer, that is, the recovery command does not include a new value of a timing duration of the T302 timer. For example, it is assumed that the timing duration of the first T302 timer is 3 s, and the timer has been running for 2 s at present, the first T302 timer is maintained, that is, the first T302 timer continues to run for 1 s.

Figure 7:
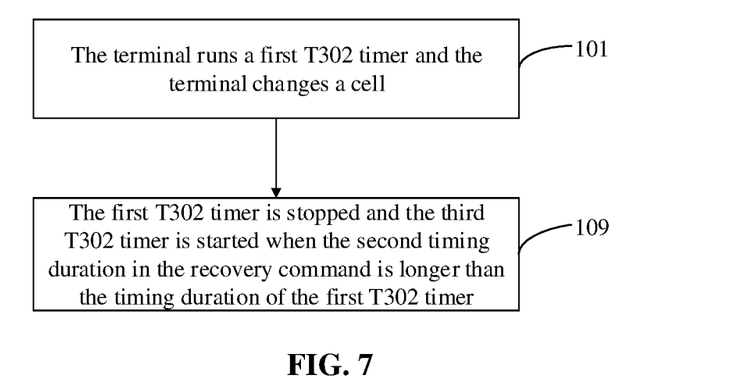
FIG. 7 is a flowchart of an access control method according to an exemplary embodiment.

FIG. 7 is a flowchart of an access control method according to an exemplary embodiment. In the method as shown in FIG. 7, the operation that the first T302 timer is stopped or maintained according to the command received from the network side device may include the following operations: in operation 109, the first T302 timer is stopped and the third T302 timer is started when a second timing duration in the recovery command is longer than the timing duration of the first T302 timer. For example, when the timing duration of the first T302 timer is 2 s and the second timing duration in the recovery command is 4 s, the first T302 timer whose timing duration is 2 s is stopped, and the third T302 timer whose timing duration is 4 s is started. On the other hand, when the second timing duration is not longer than the timing duration of the first T302 timer, for example, the timing duration of the first T302 timer is 2 s, and the second timing duration is 1.5 s, the first T302 timer is maintained, that is, the first T302 timer continues to run.

Figure 8:
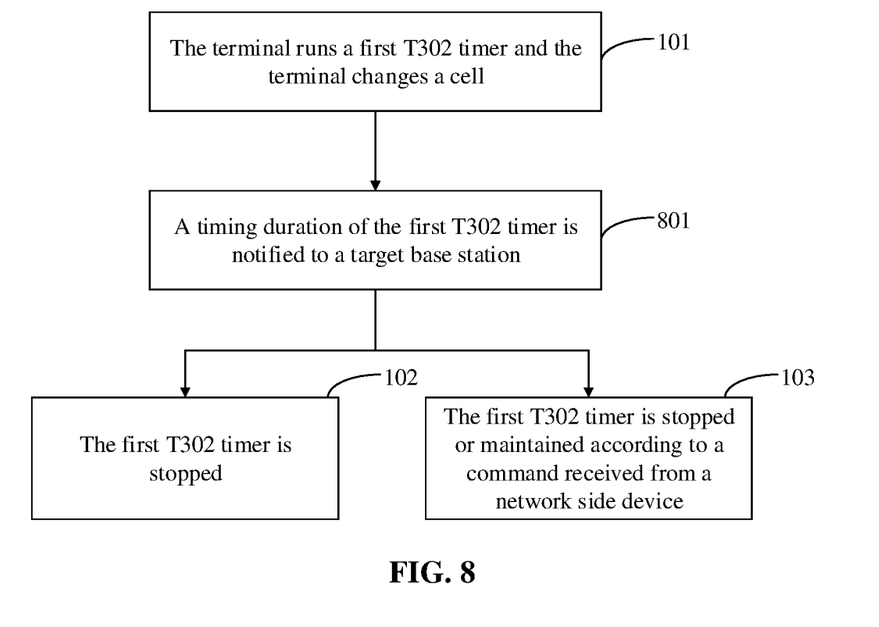
FIG. 8 is a flowchart of an access control method according to an exemplary embodiment.

FIG. 8 is a flowchart of an access control method according to an exemplary embodiment. As shown in FIG. 8, on the basis of the method shown in FIG. 1, the method further includes the following operations: in operation 801, a timing duration of the first T302 timer is notified to a target base station. The target base station is a base station of a target cell of the terminal after the terminal changes a cell. For example, when the terminal handovers the cell to which the terminal accesses, the terminal may add the timing duration of the first T302 to the handover request sent to the base station of the target cell, so that the timing duration of the first T302 timer may be used as a reference for configuring the T302 of the target cell. For another example, when the terminal updates the RNA, in the Resume process (for example, in the Resume process, if the terminal has data to be transmitted to the base station, the terminal initiates the Resume request to the base station; or if the base station has data to be transmitted to the terminal, the base station sends the RAN paging to the terminal to trigger the terminal to initiate the Resume request) when the target base station obtains the terminal context from the original base station, the timing duration of the first T302 timer can be obtained as a reference for the target base station to configure the T302 timer. The target base station corresponds to the cell in which the terminal is located after the target base station updates the RNA for the terminal. The base station mentioned in this embodiment can be such as an evolved NodeB (eNB). Here, operation 801 may be performed before operation 102 and operation 103, or may be performed after operation 102 and operation 103. Only one case in which operation 801 is performed before operation 102 and operation 103 is shown in FIG. 8.

Figure 9:
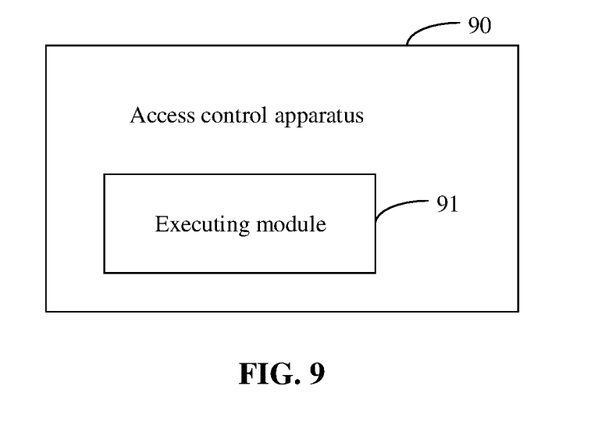
FIG. 9 is a block diagram of an access control apparatus according to an exemplary embodiment.

FIG. 9 is a block diagram of an access control apparatus according to an exemplary embodiment. The apparatus can be applied to a terminal. As shown in FIG. 9, the apparatus 90 includes an executing module 91.

The executing module 91 is configured to perform any one of the following operations when the terminal runs a first T302 timer and the terminal changes a cell:

stopping the first T302 timer, or stopping or maintaining the first T302 timer according to a command received from a network side device.

In an implementation, that the terminal changes a cell includes that the terminal hands over a cell that the terminal accesses. Based on this, the executing module may include a first stopping submodule which is configured to stop the first T302 timer when the cell handover command received from the network side device does not include a timing duration of the T302 timer.

Figure 10:
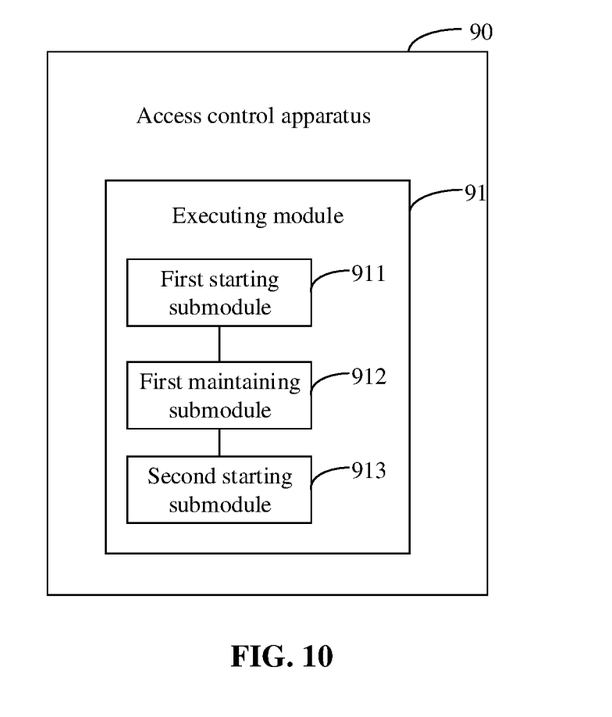
FIG. 10 is a block diagram of an access control apparatus according to an exemplary embodiment.

In an implementation, that the terminal changes the cell may include that the terminal hands over the cell that the terminal accesses. FIG. 10 is a block diagram of an access control apparatus according to an exemplary embodiment. As shown in FIG. 10, the executing module 91 may include a first starting submodule 911 which is configured to stop the first T302 timer and start a second T302 timer when the cell handover command received from the network side device includes a first timing duration. The first timing duration is a timing duration of the second T302 timer.

In an implementation, that the terminal changes the cell may include that the terminal hands over the cell that the terminal accesses. In the apparatus as shown in FIG. 10, the executing module 91 may include a first maintaining submodule 912 which is configured to maintain the first T302 timer when the cell handover command received from the network side device does not include a timing duration of the T302 timer.

In an implementation, as shown in FIG. 10, the executing module may include a second starting submodule 913 which is configured to stop the first T302 timer and start the second T302 timer when the first timing duration in the cell handover command is longer than the timing duration of the first T302 timer.

In an implementation, that the terminal changes the cell includes that the terminal performs an RNA update, and the executing module may include a second stopping submodule which is configured to stop the first T302 timer when the recovery command received from the network side device does not include a timing duration of a T302 timer.

Figure 11:
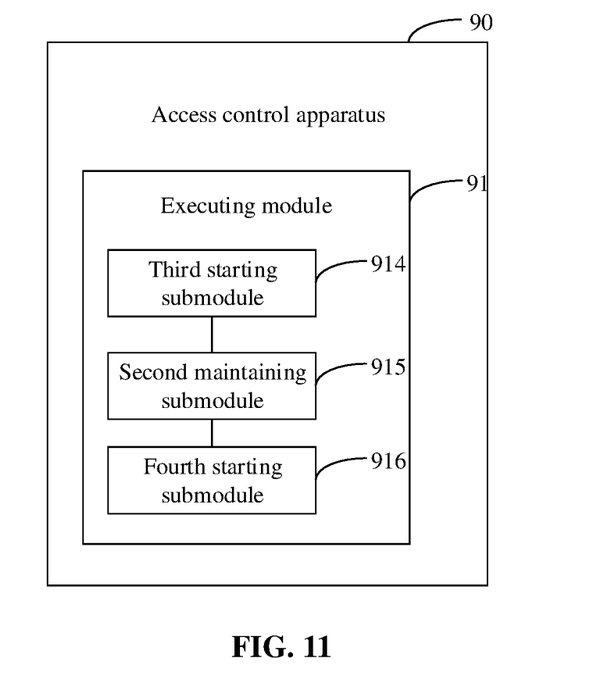
FIG. 11 is a block diagram of an access control apparatus according to an exemplary embodiment.

In an implementation, that the terminal changes the cell may include that the terminal performs an RNA update. FIG. 11 is a block diagram of an access control apparatus according to an exemplary embodiment. In the apparatus as shown in FIG. 11, the executing module 91 may include a third starting submodule 914 which is configured to stop the first T302 timer and start the third T302 timer when the recovery command received from the network side device includes a second timing duration. The second timing duration is a timing duration of the third T302 timer.

In an implementation, that the terminal changes the cell may include that the terminal performs an RNA update. In the apparatus as shown in FIG. 11, the executing module 91 may include a second maintaining submodule 915 which is configured to maintain the first T302 timer when the recovery command received from the network side device does not include a timing duration of the T302 timer.

In an implementation, as shown in FIG. 11, the executing module 91 may include a fourth starting submodule 916 which is configured to stop the first T302 timer and start the third T302 timer when the second timing duration in the recovery command is longer than the timing duration of the first T302 timer.

Figure 12:
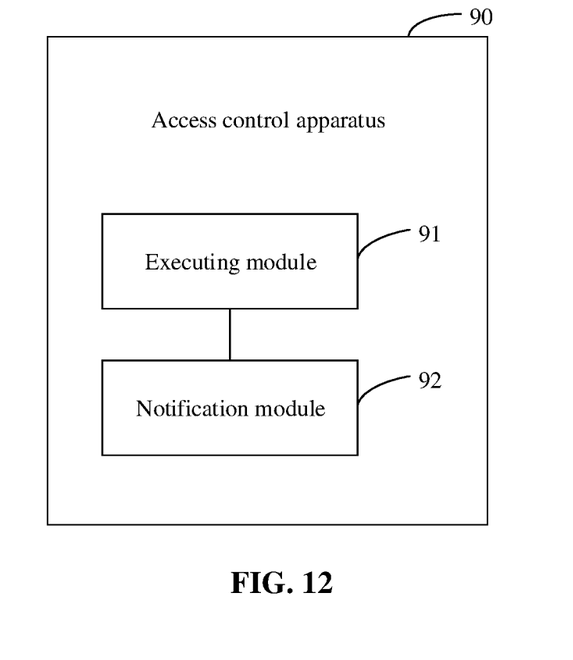
FIG. 12 is a block diagram of an access control apparatus according to an exemplary embodiment.

FIG. 12 is a block diagram of an access control apparatus according to an exemplary embodiment. As shown in FIG. 12, on the basis of FIG. 9, the apparatus may further include: a notification module 92 which is configured to notify a timing duration of the first T302 timer to a target base station. The target base station is a base station of a target cell of the terminal after the terminal changes a cell.

With respect to the apparatus in the above described embodiments, the specific manner in which the various modules perform operations has been described in detail in the embodiments relating to the method, and will not be described in detail herein.

Figure 13:
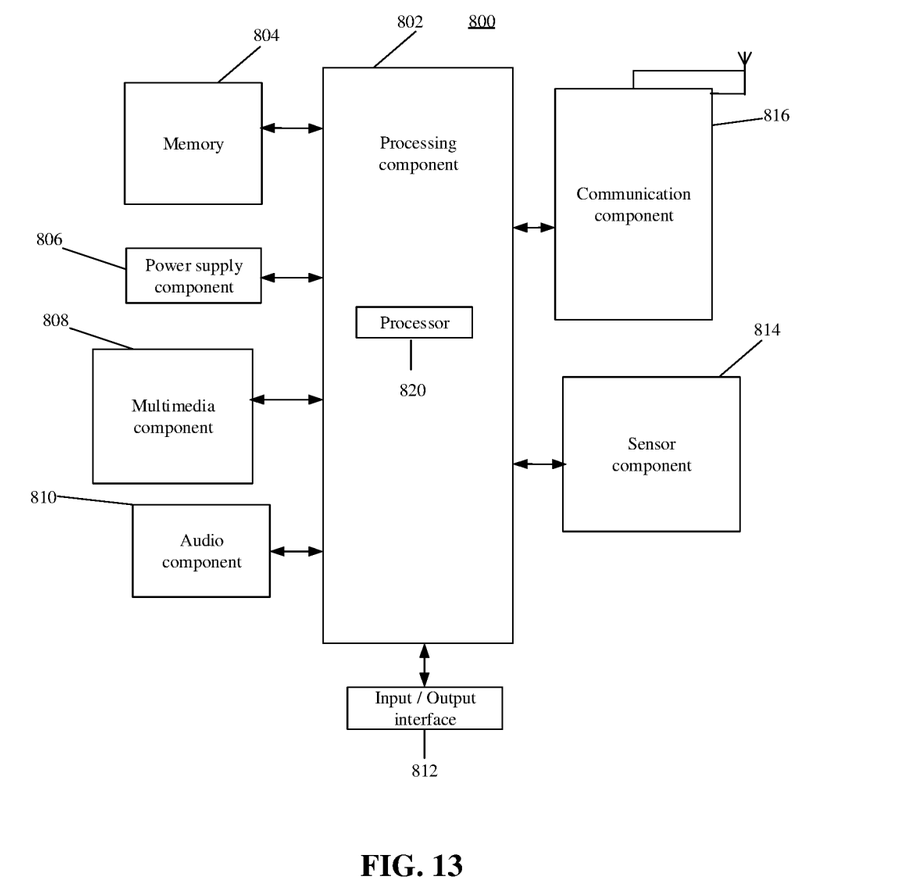
FIG. 13 is a block diagram of an access control apparatus according to an exemplary embodiment.

FIG. 13 is a block diagram of an access control apparatus according to an exemplary embodiment. For example, the apparatus 800 may be a mobile phone, a computer, a digital broadcast terminal, a messaging device, a game console, a tablet device, a medical device, an exercise device, a personal digital assistant, or the like.

Referring to FIG. 13, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operation of the apparatus 800, such as operations associated with displays, telephone calls, data communications, camera operations, and recording operations. The processing component 802 may include one or more processors 820 for executing instructions to perform all or a portion of the operations of the methods described above. In addition, the processing component 802 may include one or more modules which facilitate the interaction between the processing component 802 and other components. For example, the processing component 802 may include a multimedia module which facilitates interaction between the multimedia component 808 and the processing component 802.

The memory 804 is configured to store various types of data to support operation at the apparatus 800. Examples of such data include instructions for any application or method operating on the apparatus 800, contact data, phone book data, messages, pictures, video, etc. Memory 804 may be implemented by any type of volatile or non-volatile memory device or combination thereof, such as Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic disk or optical disk.

The power supply component 806 provides power to various components of the apparatus 800. The power supply component 806 may include a power management system, one or more power supplies, and other components associated with generation, management, and distribution of power for the apparatus 800.

The multimedia component 808 includes a screen providing an output interface provides between the apparatus 800 and the user. In some embodiments, the screen may include a Liquid Crystal Display (LCD) and a Touch Panel (TP). If the screen includes the TP, the screen may be implemented as a touch screen to receive input signals from a user. The TP includes one or more touch sensors for sensing touches, swipes and gestures on the TP. The touch sensor may not only sense a boundary of a touch or swipe action, but also detect a duration and pressure associated with the touch or swipe action. In some embodiments, the multimedia component 808 includes a front camera and/or a rear camera. The front camera and/or the rear camera may receive external multimedia data when the apparatus 800 is in an operating mode, such as a photographing mode or a video mode. Each of the front and rear cameras may be a fixed optical lens system or have a focal length and optical zooming capability.

The audio component 810 is configured to output and/or input audio signals. For example, the audio component 810 includes a Microphone (MIC) that is configured to receive external audio signals when the apparatus 800 is in an operating mode, such as a call mode, a recording mode, and a speech recognition mode. The received audio signal may be further stored in the memory 804 or transmitted via the communication component 816. In some embodiments, the audio component 810 further includes a speaker for outputting an audio signal.

The I/O interface 812 provides an interface between the processing component 802 and a peripheral interface module. The peripheral interface module may be a keyboard, a click wheel, a button, or the like. These buttons may include, but are not limited to, a home page button, a volume button, a starting button, and a locking button.

The sensor component 814 includes one or more sensors for providing a state assessment in various aspects of the apparatus 800. For example, the sensor component 814 may detect an on/off state of the apparatus 800 and a relative positioning of the components, such as a display and small keypad of the apparatus 800, and the sensor component 814 may further detect a change in position of the apparatus 800 or one of the components of the device 800, the presence or absence of contact between the user and the apparatus 800, the orientation or acceleration/deceleration of the apparatus 800, and a change in temperature of the apparatus 800. The sensor component 814 may include a proximity sensor configured to detect presence of a nearby object without any physical contact. The sensor component 814 may also include a light sensor, such as a Complementary Metal Oxide Semiconductor (CMOS) or Charge Coupled Device (CCD) image sensor, configured for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a communication-standard-based wireless network, such as a Wireless Fidelity (WiFi) network, a 2nd-Generation (2G) or 3rd-Generation (3G) network or a combination thereof. In one exemplary embodiment, the communication component 816 receives broadcast signals or broadcast-related information from an external broadcast management system via a broadcast channel In one exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra Wide Band (UWB) technology, a Bluetooth (BT) technology, and other technologies.

In an exemplary embodiment, apparatus 800 may be implemented by one or more Application Specific Integrated Circuits (ASICs), Digital Signal Processors (DSPs), Digital Signal Processing Devices (DSPD), Programmable Logic Devices (PLDs), Field Programmable Gate Arrays (FPGAs), controllers, microcontrollers, microprocessors, or other electronic components and is configured to execute the methods described above.

In an exemplary embodiment, there is also provided a non-temporary computer-readable storage medium including instructions, such as the memory 804 including instructions executable by the processor 820 of the apparatus 800 to perform the above-described methods. For example, the non-temporary computer-readable storage medium may be a ROM, a random access memory (RAM), a Compact Disc Read-Only Memory (CD-ROM), a magnetic tape, a floppy disk, an optical data storage device, or the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An access control method, applied to a terminal, comprising:
   when the terminal runs a first T302 timer and the terminal changes a cell, performing any one of the following operations:
   stopping the first T302 timer, or
   stopping or maintaining the first T302 timer according to a command received from a network side device,
   wherein the terminal changes the cell comprises:
   the terminal hands over a cell that the terminal accesses, and
   wherein stopping or maintaining the first T302 timer according to the command received from the network side device comprises:
   stopping the first T302 timer when a cell handover command received from the network side device does not include a timing duration of a T302 timer.

2. The method of claim 1, wherein stopping or maintaining the first T302 timer according to the command received from the network side device comprises:
   stopping the first T302 timer and starting a second T302 timer, when the cell handover command received from the network side device includes a first timing duration, wherein the first timing duration is a timing duration of the second T302 timer.

3. The method of claim 1, wherein stopping or maintaining the first T302 timer according to the command received from the network side device comprises:
   maintaining the first T302 timer when the cell handover command received from the network side device does not include the timing duration of the T302 timer.

4. The method of claim 2, wherein stopping or maintaining the first T302 timer according to the command received from the network side device comprises:
   stopping the first T302 timer and starting the second T302 timer, when the first timing duration in the cell handover command is longer than a timing duration of the first T302 timer.

5. The method of claim 1, wherein the terminal changes the cell comprises:
   the terminal performs a Radio Access Network Notification Area (RNA) update, and
   stopping or maintaining the first T302 timer according to the command received from the network side device comprises:
   stopping the first T302 timer when a recovery command received from the network side device does not include the timing duration of the T302 timer.

6. The method of claim 1, wherein the terminal changes the cell comprises:
   the terminal performs a Radio Access Network Notification Area (RNA) update, and stopping or maintaining the first T302 timer according to the command received from the network side device comprises:

stopping the first T302 timer and starting a third T302 timer, when a recovery command received from the network side device includes a second timing duration, wherein the second timing duration is a timing duration of the third T302 timer.

7. The method of claim 1, wherein the terminal changes the cell comprises:

the terminal performs a Radio Access Network Notification Area (RNA) update, and stopping or maintaining the first T302 timer according to the command received from the network side device comprises:

maintaining the first T302 timer when a recovery command received from the network side device does not include the timing duration of the T302 timer.

8. The method of claim 6, wherein stopping or maintaining the first T302 timer according to the command received from the network side device comprises:

stopping the first T302 timer and starting the third T302 timer, when the second timing duration in the recovery command is longer than a timing duration of the first T302 timer.

9. The method of claim 1, further comprising:

notifying a timing duration of the first T302 timer to a target base station, wherein the target base station is a base station of a target cell of the terminal after the terminal changes the cell.

10. An access control apparatus, applied to a terminal, comprising:

a processor; and a memory for storing instructions executed by the processor;

wherein the processor is configured to perform any one of the following operations when the terminal runs a first T302 timer and the terminal changes a cell:

stopping the first T302 timer, or stopping or maintaining the first T302 timer according to a command received from a network side device, wherein the terminal changes the cell comprises:

the terminal hands over a cell that the terminal accesses, and wherein the processor is configured to stop the first T302 timer when a cell handover command received from the network side device does not include a timing duration of a T302 timer.

11. The apparatus of claim 10, wherein the processor is configured to stop the first T302 timer and start a second T302 timer, when the cell handover command received from the network side device includes a first timing duration, wherein the first timing duration is a timing duration of the second T302 timer.

12. The apparatus according to claim 10, wherein the processor is configured to maintain the first T302 timer when the cell handover command received from the network side device does not include the timing duration of the T302 timer.

13. The apparatus of claim 11, wherein the processor is configured to stop the first T302 timer and start the second T302 timer, when the first timing duration in the cell handover command is longer than a timing duration of the first T302 timer.

14. The apparatus of claim 10, wherein the terminal changes the cell comprises: the terminal performs a Radio Access Network Notification Area (RNA) update, and the processor is configured to stop the first T302 timer when a recovery command received from the network side device does not include the timing duration of the T302 timer.

15. The apparatus of claim 10, wherein the terminal changes the cell comprises: the terminal performs a Radio Access Network Notification Area (RNA) update, and the processor is configured to stop the first T302 timer and start a third T302 timer, when a recovery command received from the network side device includes a second timing duration, wherein the second timing duration is a timing duration of the third T302 timer.

16. The apparatus of claim 10, wherein the terminal changes the cell comprises: the terminal performs a Radio Access Network Notification Area (RNA) update, and the processor is configured to maintain the first T302 timer when a recovery command received from the network side device does not include the timing duration of the T302 timer.

17. The apparatus of claim 15, wherein the processor is configured to stop the first T302 timer and start the third T302 timer when the second timing duration in the recovery command is longer than a timing duration of the first T302 timer.

18. The apparatus of claim 10, wherein the processor is configured to notify a timing duration of the first T302 timer to a target base station, wherein the target base station is a base station of a target cell of the terminal after the terminal changes the cell.

* * * * *